April 9, 1963   L. D. STATHAM   3,084,542
LOAD CELL
Filed Feb. 5, 1960
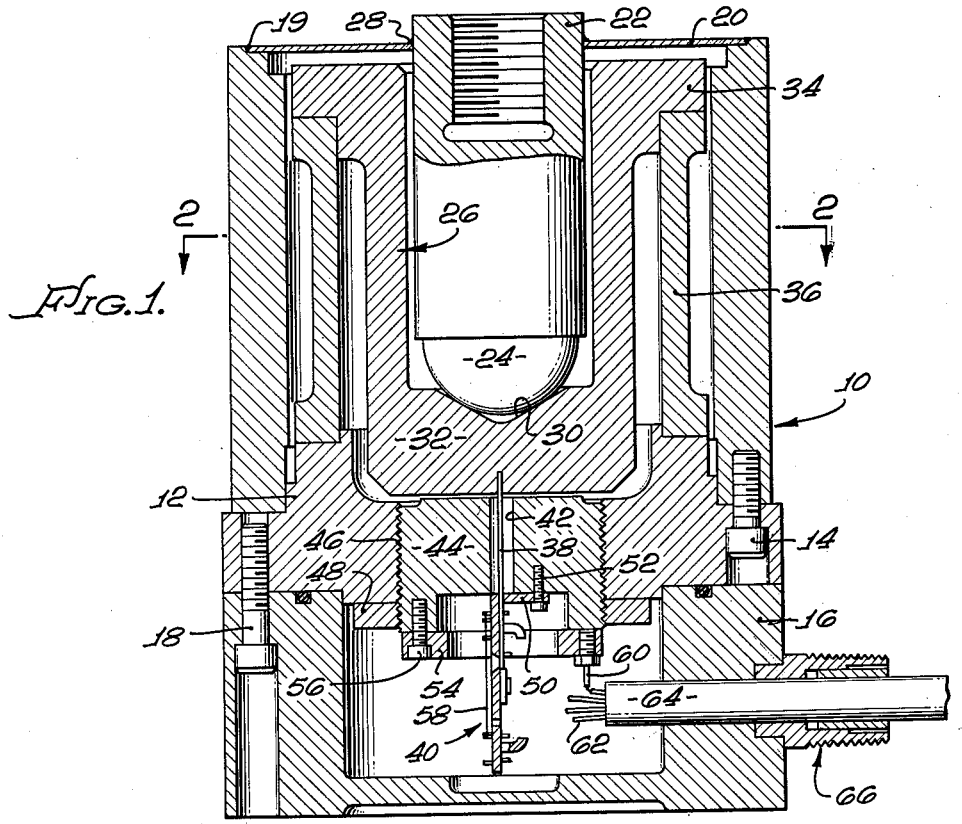
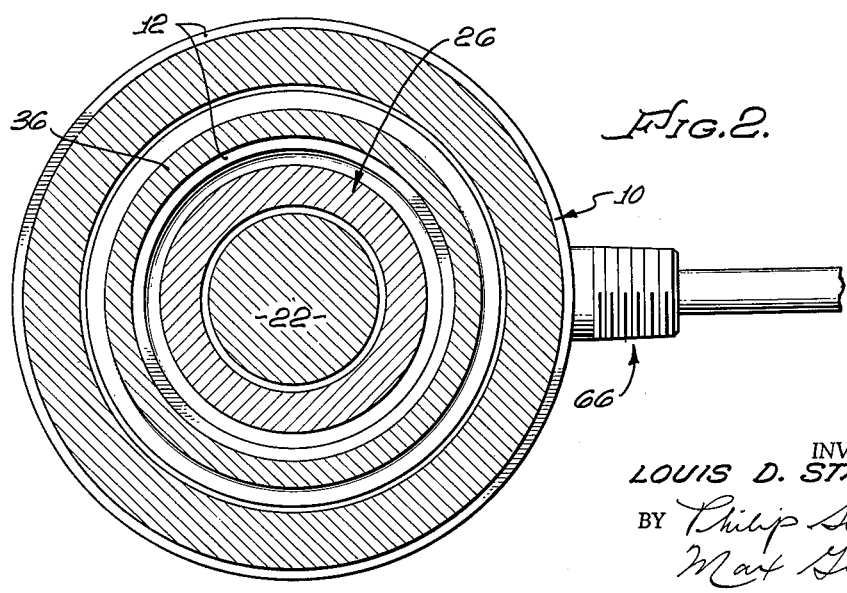
INVENTOR.
LOUIS D. STATHAM
BY
ATTORNEYS.

United States Patent Office 3,084,542
Patented Apr. 9, 1963

3,084,542
LOAD CELL
Louis D. Statham, Beverly Hills, Calif., assignor to Statham Instruments, Inc., Los Angeles, Calif., a corporation of California
Filed Feb. 5, 1960, Ser. No. 6,933
4 Claims. (Cl. 73—141)

This invention relates to a transducer or load cell capable of measuring force such as pressure or acceleration, or displacement.

Conventional load cells have a strain column which is placed under tension or compression by a force summing member, causing the strain column to be either stretched or compressed by the applied force. The resulting displacement of the strain column corresponding to the magnitude of the force applied is sensed by a motion sensing device.

Since the cross sectional area of the strain column changes during stretching or compression of the strain column, the deflection of the strain column against applied load deviates more and more from a linear relation as the load increases and the cross section of the strain column decreases or increases, depending on whether the strain column is under tension or compression. The result is that the response becomes more and more nonlinear with increasing loads, requiring close calibration of the instrument to obtain accurate readings.

In Harris Patent 2,814,946 and British Patent 645,845, load is measured by measuring a strain in the two elements of a folded column, one column being in compression while the other column is in tension. In these patents a bonded strain gage is mounted on each of the columns, and, for example, as disclosed in the Harris patent, all of the strain gages are connected in a bridge circuit so that the deviations from a straight line response of the cells under tension will tend to offset or correct deviations in the output of the cells under compression, so that the total output of the cell can be made to vary in proportion to load variations. Thus, in both patents, the principle of the devices disclosed therein is based on a "push-pull" action of bonded strain gages connected to all of the columns under compression and tension.

It is an object of this invention to design a transducer or load cell having a substantially linear response with the application of varying magnitudes of force, pressure or acceleration.

Another object is to design a load cell having a strain column which is simply and directly compensated for deviation in deflection of the column from a linear relation with respect to the applied load, as the load on the column changes.

Still another object is the provision of a transducer including means cooperating directly with only the strain column being loaded, to sense displacement of the column and obtain substantially linear response, essentially irrespective of the magnitude of the load applied to the column.

Other objects and advantages will appear or be obvious from the following description of the invention.

The instant invention is based on the discovery that in a load cell of the type having a column adapted to be placed under tension and a column simultaneously adapted to be subjected to compression as result of such tension, or vice versa, the free end of the column to which the force is applied moves in a linear manner, and by connecting any motion sensing device, such as an unbonded strain wire transducer, for example, to such free end of the column simply to measure the displacement of a point thereon due to application of an applied force, the nonlinearity of deflection of the columns themselves as result of such applied force can be directly cancelled. Hence, measurement of the strain in each of the columns, the principle employed in the above noted Harris and British patents, is avoided, and simple displacement of a point on the end of one of the columns is all that is required to be measured to obtain an accurate linear response.

More particularly, I have found that by mounting a column, e.g. in the form of a sleeve, coaxially with the strain column, which may be in the form of a tube or cup, and connecting the first mentioned column at one end thereof to the strain column and at its other end to a rigid member, in a manner more fully described below, so that when the strain column is placed under strain in one direction, e.g. under tension, by a force summing member connected to said strain column, and the first mentioned column is placed under strain in the opposite direction, e.g. under compression, to thereby resist displacement of the strain column, the strain column is thereby caused to deflect substantially linearly with increase or decrease in load thereon, and a motion sensing device, such as an unbonded strain gage, connected to the end of the strain column to measure displacement thereof, gives a linear response irrespective of change in loading.

In place of an unbonded strain wire motion sensing means, I can employ other motion sensing devices to measure the linear displacement with applied force of the end of the strain column according to the invention principle, such as a potentiometer, a magnetostriction rod, a quartz crystal or a pair of condensor plates in an oscillating circuit.

The invention will be better understood by reference to the description below of a preferred embodiment, taken in connection with the accompanying drawing wherein:

FIG. 1 is a section through a load cell according to the invention; and

FIG. 2 is a section taken on line 2—2 of FIG. 1.

Referring to the drawing, numeral 10 represents a housing having a rigid block member 12 connected to one end thereof by means of screws 14, with a cap 16 carried on block member 12 by means of screws 18. The opposite end of the housing 10 is closed by a stay plate 20 welded at 19 or otherwise connected to the adjacent end of housing 10.

A load column or bar 22 having a ball ended portion 24 is mounted for axial motion within a tubular member having a closed end, in the form of a cup 26. The load column 22 passes through the stay plate 20 and is welded at 28 to the stay plate. The ball 24 at the end of the load column is received in a recess 30 at the closed end or bottom 32 of cup 26, thus maintaining the column 22 in axial position in the cup. The stay plate 20 and recess 30 maintain the bar 22 in axial alignment in the cup 26. The stay plate is formed of a relatively thin resilient plate offering relatively insignificant resistance to displacement by a force applied to the load column 22.

The cup 26 has a flanged portion 34 at its upper end, said flange resting on a sleeve or strain collar 36 positioned axially about the strain cup 26. The collar 36 extends downwardly and is spaced from the outer wall of cup 26. Collar 36 rests at its lower end on the rigid block member 12.

Connected centrally to the bottom 32 of the strain cup 26, and extending downwardly axially of the cup is a rod 38 which is connected at its lower end to a transducer in the form of an unbonded electrical resistance strain wire transducer, indicated generally by the numeral 40. Such strain wire transducer is of the type described in my Patent No. 3,573,286. Since this transducer per se forms no part of the instant invention, it will not be described in detail herein, reference being had to said patent for a full and complete description of such strain wire transducer. Any other type of transducer, such as, for example, an inductive type pickoff, can be employed in place of the unbonded resistance strain gage represented by numeral 40.

The rod 38 passes through an aperture 42 provided in a plug 44 which is threadably mounted at 46 axially within the block member 12, a stop nut 48 being threaded onto the lower end of plug 44 and abutting the surface of block 12, to maintain plug 44 in axial position and spaced a short distance from the bottom 32 of cup 26. The transducer 40 is mounted on a bracket 50 connected by screws 52 to the plug 44. A terminal header 54 is connected by screws 56 to plug 44, the strain wires 58 of transducer 40 being connected by leads (not shown) in a bridge circuit of the conventional type, and the terminals of the bridge are connected by leads (not shown) to terminals 60 mounted in header 54. Leads 62 from terminals 60 are passed externally through a cable 64 held in position on cap 16 by the terminal cover represented by numeral 66.

When an axial force is applied downwardly to the load column or bar 22, the tube or cup 26 is placed in tension, and the sleeve or strain collar 36 is placed under compression against the rigid block member 12. As the tension on the cup increases, its cross sectional area tends to decrease and to change the ratio of the deflection to applied load. However, the strain collar 36 under compression becomes increasingly more rigid as the strain in tension on the strain column or cup 26 increases. This increasing rigidity of member 36 with increasing tension placed on the cup 26 substantially compensates for or cancels out any change in the aforementioned ratio as the force applied increases, and the actual displacement of the strain cup 26 remains substantially directly proportional to the force applied, giving a linear response as measured by the transducer. The same compensation in reverse takes place when the load in tension on the column is reduced.

It will be understood that the structure can be modified so that the aforementioned compensation can also take place where the strain cup 26 is placed under compression, causing the reacting column 36 to undergo stretching. In such a modification it is apparent that the ball 24 is positively connected to the bottom 32 of cup 26. In this case the rigidity of the cup 26 increases with increased application of force, but this is compensated for by increasing tendency toward stretching of the column 36, producing a substantially linear displacement of the strain cup and linear response regardless of the magnitude of the load on the load column.

The device of the invention also greatly facilitates calibration and increases the accuracy of the instrument.

While I have described a particular embodiment of my invention for the purpose of illustration, it should be understood that various modifications and adaptations thereof may be made within the spirit of the invention as set forth in the appended claims.

I claim:

1. A load cell comprising a base; a first column means having an axis, a first set of first and second axially spaced points, and a second set of first and second axially spaced points, said axial spacings being equal, said first and second sets being located on opposite sides of said axis, the line on which said first set of points lie and the line on which said second set of points lie being parallel to and equally spaced from said axis; a second column means having an axis coincident with said axis of said first column means, said second column means also having a first set of first and second axially spaced points and a second set of first and second axially spaced points, the two last-mentioned axial spacings being equal, the last-mentioned first and second sets being located on opposite sides of said coincident axes, the line on which the last-mentioned first set of points lie and the line on which the last-mentioned second set of points lie being parallel to and equally spaced from said coincident axes; said first points on said first column means being coupled to said base, said second points on said first column means being coupled to said first points on said second column means, force summing means coupled to said second points on said second column means for applying a force thereto in a direction substantially parallel to said coincident axes; the axial distance between said first points on said first column means and said second points on said second column means being equal to the difference between said axial spacing of points on one column means and said axial spacing of points on the other column means; said second points on said second column means being spaced from said base along lines parallel with said coincident axes; and a motion sensing means having a first portion coupled to said second column means in the area between said second points thereof and a second portion coupled to said base, said two portions cooperating along a line substantially parallel with said coincident axes to determine the spatial displacement along the last-mentioned line between said second column means and said base as a measure of the force applied to said second column means by said force summing means.

2. A load cell as set forth in claim 1, wherein said motion sensing means is an unbonded strain wire gage.

3. A load cell, comprising a base, a first column having first and second axially spaced points, a second column having first and second axially spaced points and being oriented with its axis substantially parallel with the axis of said first column, said first point of said first column being coupled to said base, said second point on said first column being coupled to said first point on said second column, a force summing means coupled to said second point on said second column for applying a force thereto in a direction substantially parallel to said axes, the axial distance between said first point on said first column and said second point on said second column being equal to the difference between the axial spacing of said two points on one column and the axial spacing of said two points on the other column, said second point on said second column being spaced from said base along a line parallel with said axes, and a motion sensing means having a first portion coupled to said second column approximately in the area of said second point thereof and a second portion coupled to said base, said two portions cooperating along a line substantially parallel with said axes to determine the spatial displacement along the last mentioned line between said second column and said base as a measure of the force applied to said second column by said force summing means, said first column being a cylinder, said second column being a cup within said cylinder, and said second point on said second column being the bottom of said cup.

4. A load cell, comprising a base, a first column having first and second axially spaced points, a second column having first and second axially spaced points and being oriented with its axis substantially parallel with the axis of said first column, said first point of said first column being coupled to said base, said second point on said first column being coupled to said first point on said second column, a force summing means coupled to said second point on said second column for applying a force thereto in a direction substantially parallel to said axes, the axial distance between said first point on said first column and said second point on said second column being equal to the difference between the axial spacing of said two points on one column and the axial spacing of said two points on the other column, said second point on said second column being spaced from said base along a line parallel with said axes, and a motion sensing means having a first portion coupled to said second column approximately in the area of said second point thereof and a second portion coupled to said base, said two portions cooperating along a line substantially parallel with said axes to determine the spatial displacement along the last mentioned line between said second column and said base as a measure of the force applied to said second column by said force summing means, said first column being a cylinder, said second column being a cup within said cylinder, and said second point on said second column being the bottom of said cup, said motion sensing means being an unbonded strain wire gage coupled between the bottom of said cup and said base.

References Cited in the file of this patent

UNITED STATES PATENTS

| | | |
|---|---|---|
| 2,053,560 | Janovsky | Sept. 8, 1936 |
| 2,814,946 | Harris | Dec. 3, 1957 |
| 2,844,027 | Davie | July 22, 1958 |